April 11, 1967    J. J. SAUKA    3,313,521
PORTABLE CHAIN HOIST
Filed July 14, 1965    2 Sheets-Sheet 1

Joseph J. Sauka
INVENTOR.

April 11, 1967  J. J. SAUKA  3,313,521
PORTABLE CHAIN HOIST
Filed July 14, 1965  2 Sheets-Sheet 2
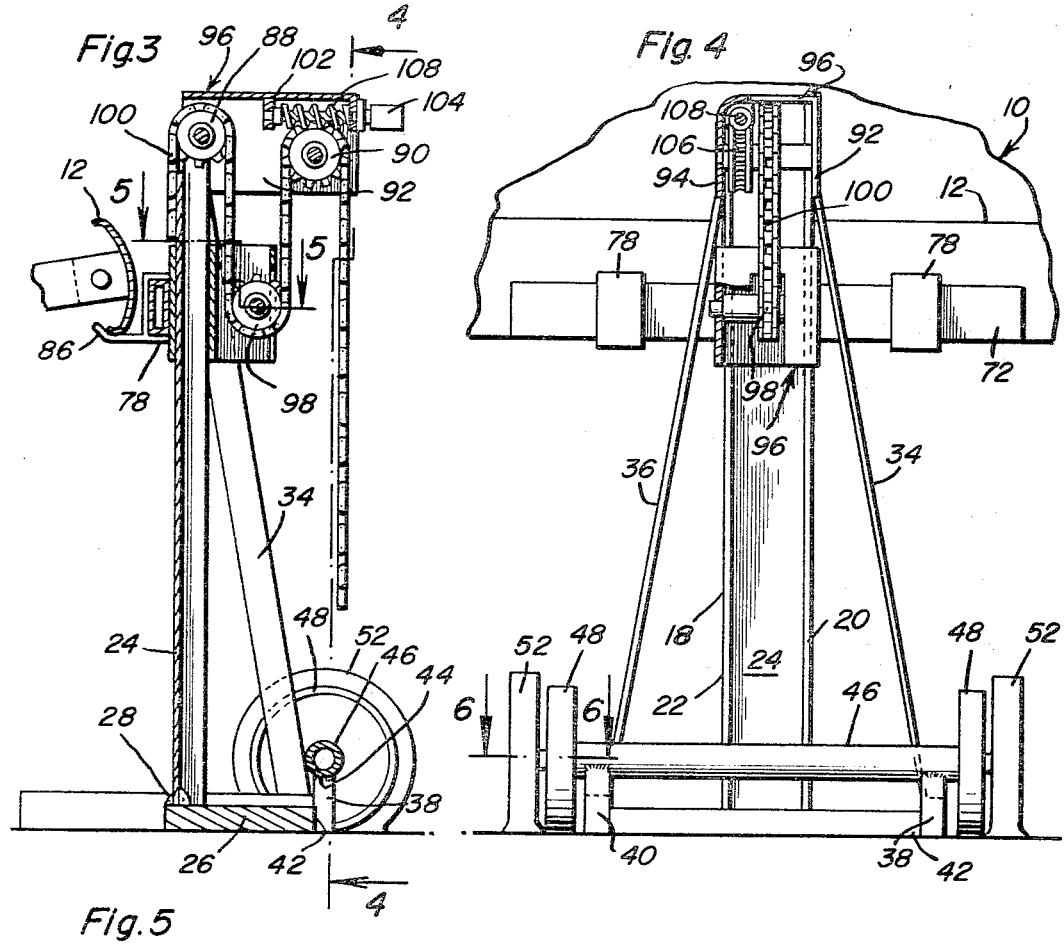
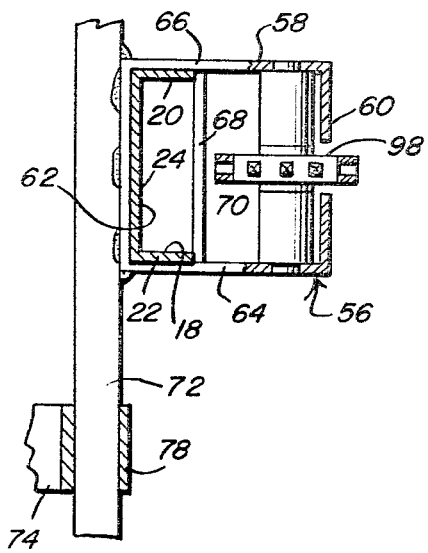
Joseph J. Sauka
INVENTOR.

United States Patent Office 3,313,521
Patented Apr. 11, 1967

3,313,521
PORTABLE CHAIN HOIST
Joseph J. Sauka, 77 Swartz St., Elma, N.Y. 14059
Filed July 14, 1965, Ser. No. 471,942
6 Claims. (Cl. 254—4)

This invention relates to a novel and useful portable chain hoist and more specifically to a chain hoist designed primarily as a vehicle jack for lifting various portions of a vehicle from a supporting surface.

The portable chain hoist of the instant invention includes an upright member having a lift member mounted thereon for up and down movement therealong. Force means is connected between the upright and the lift member for causing upward movement of the latter along the upright. In addition, resilient wheel means is journaled from a lower portion of the upright for rotation about a horiozntal axis and at least partially supports the upright for rolling movement across the supporting surface. The lower end portion of the upright also includes rigid foot means spaced slightly above a horizontal plane containing the lower surfaces of the resilient wheel means and the resiliency of the wheel means provided is such that when a predetermined load is supported from the lift member the wheel means will yield under the load and lower the foot means of the upright into engagement with the supporting surface thereby ensuring that the hoist or jack will not shift relative to the supporting surface while supporting a load.

In addition to the above feature of the instant invention, the upper end of the upright has a first fixed upright sprocket wheel supported therefrom and a second drive sprocket wheel is journaled for rotation about a horizontal axis from another upper portion of the upright and aligned with the first rigid sprocket wheel. Further, a third sprocket wheel is journaled from the lift member which is movable up and down the upright and the third sprocket wheel is also journaled for rotation about a horizontal axis and aligned with the first and second sprocket wheels. Means is provided for effecting rotation of the second sprocket wheel and a length of flexible chain is entrained over the first and second wheels and under the third sprocket wheel. In this manner, rotation of the second sprocket wheel by any suitable drives means at a given peripheral speed will effect vertical movement of the lift member along the upright from which it is supported at a linear speed equal to one-half the peripheral speed of the second sprocket wheel. Inasmuch as the length of chain is merely entrained over the first rigid sprocket wheel and the adjacent end of the chain is free, the free end of the chain may be grasped, lifted from engagement with the first sprocket wheel and longitudinally shifted before again being engaged with the sprocket wheel in order to effect adjustment of the height of the lift member when the latter is not supporting a heavy load.

A high torque developing drive means is operatively associated with the second sprocket wheel and comprises a gear wheel concentric and mounted for rotation with the second sprocket wheel and a worm gear journaled from the standard and meshed with the gear wheel. Any suitable crank means or rotatable output shaft of any suitable power source may be operatively coupled with the worm gear to effect its rotation in order to in turn effect rotation of the gear wheel and second sprocket wheel mounted for rotation therewith. The worm gear drive of the portable chain hoist of the instant invention obviously provides a numerically high gear ratio for multiplying input torque and thus very little effort is required to operate the chain hoist of the instant invention in order to lift a relatively heavy load. In addition, the worm gear drive further eliminates the necessity for detent ratchet means to prevent a load supported from the lift member to cause rotation of the input worm gear.

The main object of this invention is to provide a portable chain hoist for use in garages and similar locations wherein considerable work is done on the vehicles that require that various portions of the vehicles be lifted from a supporting surface.

Another object of this invention is to provide a portable chain hoist including a numerically high gear reduction input drive assembly of the aforementioned type in combination with readily releasable and engageable means for effecting quick initial adjustment of the lift member of the hoist when the latter is not supporting a heavy load. In this manner coarse adjustment of the unloaded lift member may be readily accomplished almost instantaneously with little effort and yet the chain hoist is constructed in a manner whereby the height of the lift member may be precisely adjusted when supporting heavy loads and the need for detent, ratchet or pawl means for retaining the lift member of the hoist in adjusted elevated positions is eliminated.

Still another object of this invention is to provide a portable chain hoist in accordance with the preceding objects and including novel support means which are adapted to at least partially rollingly support the chain hoist during movement from one location to another while unloaded and yet which is automatically operable to non-rollingly support the chain hoist when the latter is used to support a heavy load.

A final object of this invention to be specifically enumerated herein is to provide a portable chain hoist in accordance with the preceding objects which will conform to conventional forms of the manufacture, be of simple construction and easy to use so as to provide a device that will be economically feasible, long lasting and relatively trouble-free in operation.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 3 is a vertical sectional view of the chain hoist taken substantially upon the plane indicated by the section line 3—3 of FIGURE 2;

FIGURE 4 is a vertical sectional view taken substantially upon the plane indicated by the section line 4—4 of FIGURE 3;

FIGURE 5 is an enlarged fragmentary horizontal sectional view taken substantially upon the plane indicated by the section line 5—5 of FIGURE 3; and FIGURE 6 is a fragmentary enlarged horizontal section view taken substantially upon the plane indicated by the section line 6—6 of FIGURE 4.

Figure 1:
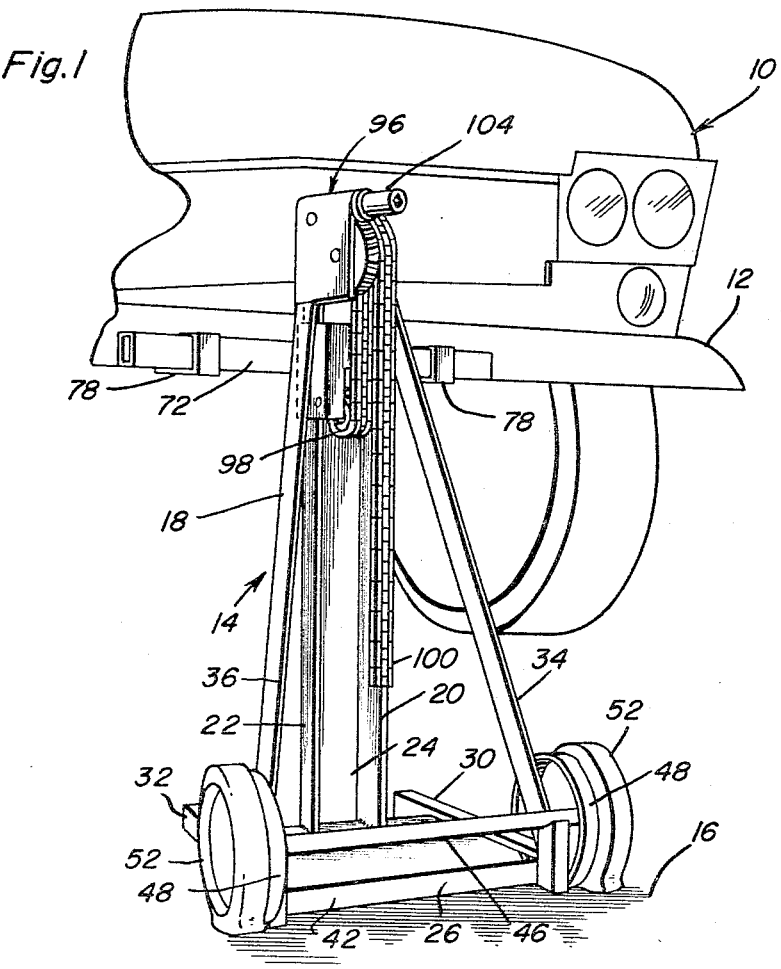
FIGURE 1 is a fragmentary perspective view of the front portion of a conventional vehicle illustrated in an elevated position above a supporting surface by means of support from the pivotal chain hoist of the instant invention disposed on the aforementioned supporting surface.
Figure 2:
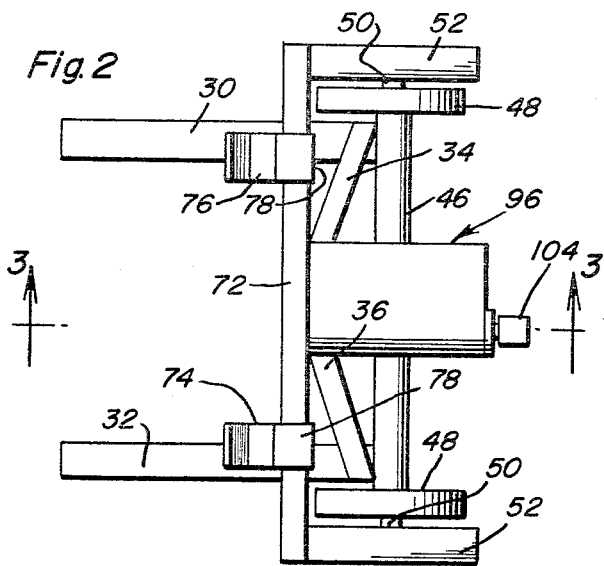
FIGURE 2 is a top plan view of the chain hoist.

Referring now more specifically to the drawings the numeral 10 generally designates a conventional form of motor vehicle including a front bumper 12. The portable hoist of the instant invention is generally referred to by the reference numeral 14 and is illustrated in FIGURES 1-3 of the drawings as supporting the front of the vehicle 10 above a supporting surface 16.

The portable hoist 14 comprises an elongated upright 18 which is generally channnel-shaped in cross-section including a pair of vertical flanges 20 and 22 interconnected by means of a bight portion 24. The lower end of the upright 18 is secured to a base plate 26 in any convenient manner such as by welding 28 and the opposite ends of the base plate 26 include a pair of rearwardly projecting arms 30 and 32 whose lower surfaces, together with the undersurface of the base plate 26, are adapted to frictionally abut the surface 16.

A pair of opposite side inclined brace members 34 and 36 are secured between the upper surfaces of the forward ends of the arms 30 and 32 and opposite sides of the upper portion of the upright 18. In addition, a pair of upstanding front foot members 38 and 40 are secured to the front edge 42 of the base plate 26 at opposite ends thereof and include lower surfaces 43 which are substantially coplanar with the lower surfaces of the base plate 26 and the arms 30 and 32. The upper ends of the foot members 38 and 40 are notched as at 44 and the opposite end portions of a rigid axle assembly 46 are cradled and secured in the notches 44.

A pair of rigid fixed wheels 48 are secured to the opposite ends of the axle assembly 46 and disposed outwardly of the arms 30 and 32. In addition, a pair of stub axle members 50 are secured in the opposite ends of the axle assembly 46, project outwardly of the rigid wheels 48, and have resilient wheels 52 journaled thereon.

The lower peripheral surfaces of the resilient wheels 52 are normally disposed lower than the lower peripheral portions of the rigid wheels 48 but the resiliency of the wheels 52 is such that when a load such as the front of the vehicle 10 is supported from the hoist 14 the resilient wheels 52 will yield under this load and lower the rigid wheels 48 down into contact with the surface 16, and also the foot members 38 and 40 into contact with the surface 16.

With attention now invited more specifically to FIGURES 3–5 of the drawings it may be seen that a lift member generally referred to by the reference numeral 56 is slidably mounted on the upright 18. The lift member 56 includes a tubular body portion 58 which is substantially rectangular in cross-section and includes front and rear walls 60 and 62 interconnected by means of opposite side walls 64 and 66. In addition, a partition wall 68 is also secured between the opposite side walls 64 and 66 intermediate the front and rear walls 60 and 62 to define a vertically extending passage 70 which slidably receives therethrough the upright 18 and thereby mounts the lift member 56 on the upright 18 for vertical movement therealong.

The rear wall 62 of the lift member 56 has a horizontal transverse load arm 72 secured thereto which projects beyond the opposite side walls 64 and 66. A pair of lift arms 74 and 76 are provided and include sleeve portions 78 and 80, respectively, which are slidably disposed on the load arm 72 for longitudinal movement therealong. The free ends of the lift arms 74 and 76 are upwardly directed as at 86 and adapted to engage the lower edge portion of the front bumper 12 of the vehicle 10 in order to effect a lifting force on the bumper 12.

A first rigid sprocket wheel 88 is supported between the upper ends of the flanges 20 and 22 and a second sprocket wheel 90 is journaled between the opposite side walls 92 and 84 of the downwardly opening housing generally referred to by the reference numeral 96 secured to the top of the upright 18. The sprocket wheels 88 and 90 are aligned and a third sprocket wheel 98 is journaled between the opposite walls 64 and 66 and is also in alignment with the first and second sprocket wheels 88 and 90.

One free end portion of a flexible chain 100 is entrained over the rigid sprocket wheel 88 and the other free end of the chain 100 is entrained over the second sprocket wheel 90, an intermediate portion of the flexible chain 100 being entrained under the third sprocket wheel 98.

From FIGURE 3 of the drawings it may be seen that the reaches of the chain 100 extending between the sprocket wheels 88 and 98 and between the sprocket wheel 90 and the sprocket wheel 88 are substantially parallel. A torque input worm gear is journaled from the top wall 102 of the housing 96 and includes a torque input member 104 which is adapted to have a handcrank or a rotatable output shaft of a suitable power source drivingly connected thereto. A gear wheel 106 with which the worm gear 108 is meshed is also journaled for rotation from the housing 96 and for rotation with the second sprocket wheel 90 about an axis coinciding with the axis of rotation of the sprocket wheel 90. Thus, rotation of the worm gear 108 will effect rotation of the second sprocket wheel 90. The rotation of the second sprocket wheel 90 at a given peripheral speed will effect lifting movement of the lift member 56 at a linear speed equal to one-half the peripheral speed of the second sprocket wheel 90.

The gear reduction between the worm gear 108 and the gear wheel 106 is sufficiently numerically high to prevent the load defined by the vehicle 10 causing the worm gear 108 to rotate and to thereby allow the vehicle 10 to be lowered. Accordingly, the necessity for detents, locking pawls and/or ratchet assemblies is eliminated and the vertical adjustment of the lift member 56 in an unloaded condition may be readily accomplished by disengaging either of the free ends of the chain 100 from the rigid sprocket wheel 88 or the second sprocket wheel 90 and longitudinally displacing that end portion of the chain 100 and again engaging the chain with the corresponding sprocket wheel.

The foregoing is considered as illustrative only of the principles of the invention. Further, since numerous modifications and changes will readily occur to those skilled in the art, it is not desired to limit the invention to the exact construction and operation shown and described and accordingly all suitable modifications and equivalents may be resorted to, falling within the scope of the invention as claimed.

What is claimed as new is as follows:

1. A portable hoist comprising an upright having supporting foot means at its lower ends, a lift member mounted on said upright for up and down movement therealong, a first fixed upright sprocket wheel carried by an upper portion of said upright, a second drive sprocket wheel journaled for rotation about a horizontal axis from another upper portion of said upright and aligned with said first sprocket wheel, a third sprocket wheel journaled from said lift member for rotation about a horizontal axis and aligned with said first and second sprocket wheels, means for effecting rotation of said second sprocket wheel, and a length of flexible chain entrained over said first and second sprocket wheels and under said third sprocket wheel.

2. The combination of claim 1 including resilient wheel means journaled from a lower portion of said upright about a horizontal axis and at least partially supporting said upright for rolling movement across a supporting surface, said foot means being spaced slightly above a horizontal plane containing the lower surfaces of said wheel means being such that when a predetermined load is supported from said lift member said wheel means will yield under said load and lower said foot means into engagement with said supporting surface.

3. The combination of claim 1 wherein said upright includes an upright channel member including a pair of upright legs interconnected by a bight portion and on which said lift member is mounted, said first sprocket wheel being supported between said legs adjacent their upper ends.

4. The combination of claim 3 wherein said lift member includes an upstanding tubular member snugly and slidingly receiving said channel member therethrough.

5. The combination of claim 1 wherein said chain defines substantially parallel and vertical reaches extending between said first and third sprocket wheels, and between said second and third sprocket wheels.

6. The combination of claim 1 wherein said means for effecting rotation of said second sprocket wheel comprises a toothed gear wheel mounted concentrically with said second sprocket wheel and for rotation therewith and a worm drive gear journaled from said standard and in meshed engagement with said toothed gear wheel.

References Cited by the Examiner

UNITED STATES PATENTS

| | | | |
|---|---|---|---|
| 1,306,431 | 6/1919 | Klemme | 187—11 X |
| 1,813,429 | 7/1931 | Sexton | 254—7 X |
| 2,222,243 | 11/1940 | Sandstrom | 254—4 X |
| 2,597,740 | 5/1952 | Lyle | 254—139.1 X |
| 2,742,257 | 4/1956 | Hott et al. | 254—7 |
| 2,792,079 | 5/1957 | Gibson | 187—9 |
| 2,895,712 | 7/1959 | Stovern et al. | 254—7 X |
| 2,909,358 | 10/1959 | Southerwick | 254—2 X |
| 2,937,002 | 5/1960 | Schultz | 254—2 X |

FOREIGN PATENTS

| | | |
|---|---|---|
| 529,458 | 9/1921 | France. |
| 1,059,182 | 11/1953 | France. |

WILLIAM FELDMAN, *Primary Examiner.*

MILTON S. MEHR, *Examiner.*